US011061539B2

(12) United States Patent
 Orofino

(10) Patent No.: US 11,061,539 B2
(45) Date of Patent: Jul. 13, 2021

(54) REFERENCE NODES IN A COMPUTATIONAL GRAPH

(71) Applicant: The MathWorks, Inc., Natick, MA (US)

(72) Inventor: Donald P. Orofino, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 412 days.

(21) Appl. No.: 13/834,066

(22) Filed: Mar. 15, 2013

(65) Prior Publication Data
 US 2014/0282180 A1 Sep. 18, 2014

(51) Int. Cl.
 *G06F 3/048* (2013.01)
 *G06F 3/0484* (2013.01)
 *G06F 9/46* (2006.01)
 *G06F 8/30* (2018.01)

(52) U.S. Cl.
 CPC ............ *G06F 3/0484* (2013.01); *G06F 8/314* (2013.01); *G06F 9/46* (2013.01)

(58) Field of Classification Search
 CPC . G06F 8/34; G06F 3/0481; G06F 9/06; G06F 3/0484; G06F 17/50; G06F 8/451; G06F 9/44; G06F 17/12; G06F 17/13; G06F 17/504; G06F 8/314; G06F 9/46; G05B 19/0426
 USPC .......................................... 715/744, 763, 771
 See application file for complete search history.

(56) References Cited

U.S. PATENT DOCUMENTS

| | | | | |
|---|---|---|---|---|
| 8,793,599 B1* | 7/2014 | Lajoie | ..................... | G06F 17/50 715/762 |
| 9,223,488 B1* | 12/2015 | Lajoie | ................... | G06F 3/0485 |
| 2002/0080174 A1* | 6/2002 | Kodosky | .................. | G06F 8/34 715/762 |
| 2002/0178285 A1* | 11/2002 | Donaldson | .......... | G06F 17/5022 709/237 |

(Continued)

FOREIGN PATENT DOCUMENTS

WO    WO 2008/021953 A2    2/2008

OTHER PUBLICATIONS

On the implementation of automatic differentiation tools; Published date Oct. 31, 2008.*

(Continued)

*Primary Examiner* — Alex Olshannikov
(74) *Attorney, Agent, or Firm* — Cesari and McKenna, LLP; Michael R. Reinemann

(57) ABSTRACT

A device receives information that identifies a primary node included in a computational graph. The primary node represents a first operation, that modifies a state value associated with the primary node and a reference node, when the primary node is executed. The device receives information that identifies the reference node included in the computational graph. The reference node represents a second operation, that modifies the state value associated with the primary node and the reference node, when the reference node is executed. The device obtains the computational graph that includes the primary node and the reference node, and executes the primary node and the reference node in a single iteration of the computational graph. The device modifies the state value, associated with the primary node and the reference node, based on executing the primary node and the reference node.

26 Claims, 12 Drawing Sheets

(56) References Cited

U.S. PATENT DOCUMENTS

| | | | |
|---|---|---|---|
| 2003/0097644 A1* | 5/2003 | Hong | G06F 17/5045 716/104 |
| 2003/0112831 A1* | 6/2003 | Williams | H04Q 11/06 370/535 |
| 2006/0271568 A1* | 11/2006 | Balkir et al. | 707/100 |
| 2007/0044030 A1* | 2/2007 | Hayles | G06F 8/34 715/762 |
| 2007/0094485 A1* | 4/2007 | Kim et al. | 712/241 |
| 2007/0239993 A1* | 10/2007 | Sokolsky | G06F 21/563 713/188 |
| 2007/0271381 A1 | 11/2007 | Wholey et al. | |
| 2008/0034298 A1* | 2/2008 | Kodosky | G06F 3/0484 715/763 |
| 2008/0049022 A1* | 2/2008 | Sherb | G06F 9/5038 345/440 |
| 2008/0059944 A1* | 3/2008 | Patterson | G06F 8/10 717/104 |
| 2008/0072211 A1* | 3/2008 | Rothman | G06F 9/4403 717/122 |
| 2008/0126956 A1* | 5/2008 | Kodosky | G06F 8/34 715/763 |
| 2008/0271041 A1 | 10/2008 | Sakai | |
| 2009/0030863 A1* | 1/2009 | Stanfill | G06F 9/4436 706/45 |
| 2009/0113322 A1* | 4/2009 | Rogers | G06F 8/34 715/764 |
| 2009/0119640 A1* | 5/2009 | Ramsey et al. | 717/109 |
| 2009/0259769 A1* | 10/2009 | Lakshmanan | H04L 45/02 709/241 |
| 2011/0072241 A1* | 3/2011 | Chen et al. | 712/202 |
| 2011/0145748 A1* | 6/2011 | Farver | G06F 8/71 715/771 |
| 2011/0255418 A1* | 10/2011 | van Greunen et al. | 370/242 |
| 2011/0296250 A1* | 12/2011 | Calsyn et al. | 714/46 |
| 2012/0233326 A1* | 9/2012 | Shaffer | H04W 4/005 709/225 |
| 2013/0232433 A1* | 9/2013 | Krajec et al. | 715/771 |
| 2014/0081896 A1* | 3/2014 | Ranganathan | G06N 5/02 706/48 |
| 2016/0062776 A1* | 3/2016 | Stanfill | G06F 8/43 719/331 |

OTHER PUBLICATIONS

Notification of International Search Report and the Written Opinion of the International Searching Authority, or the Declaration corresponding to PCT/US2013/076998, dated Apr. 14, 2014, 10 pages.

* cited by examiner

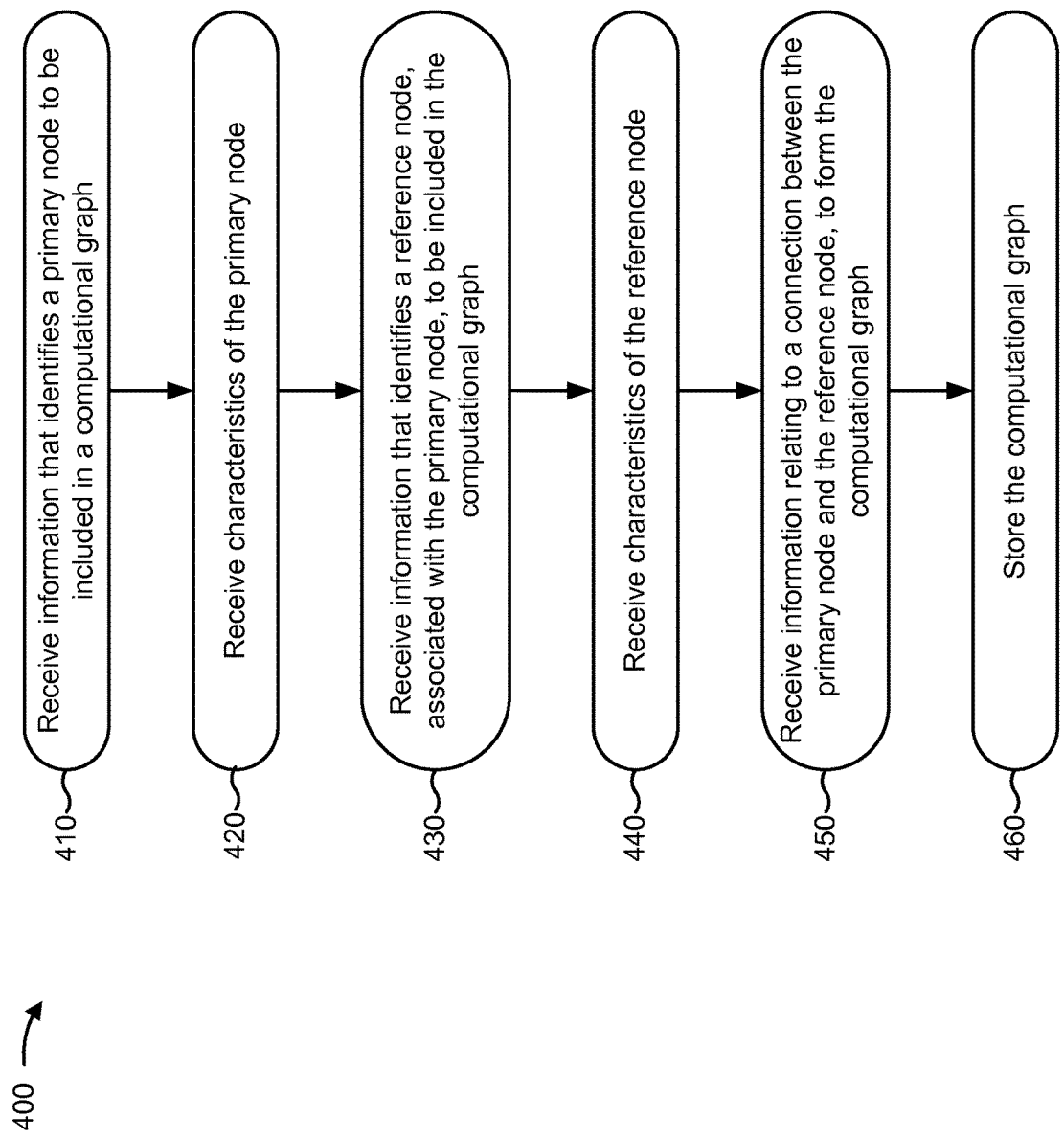

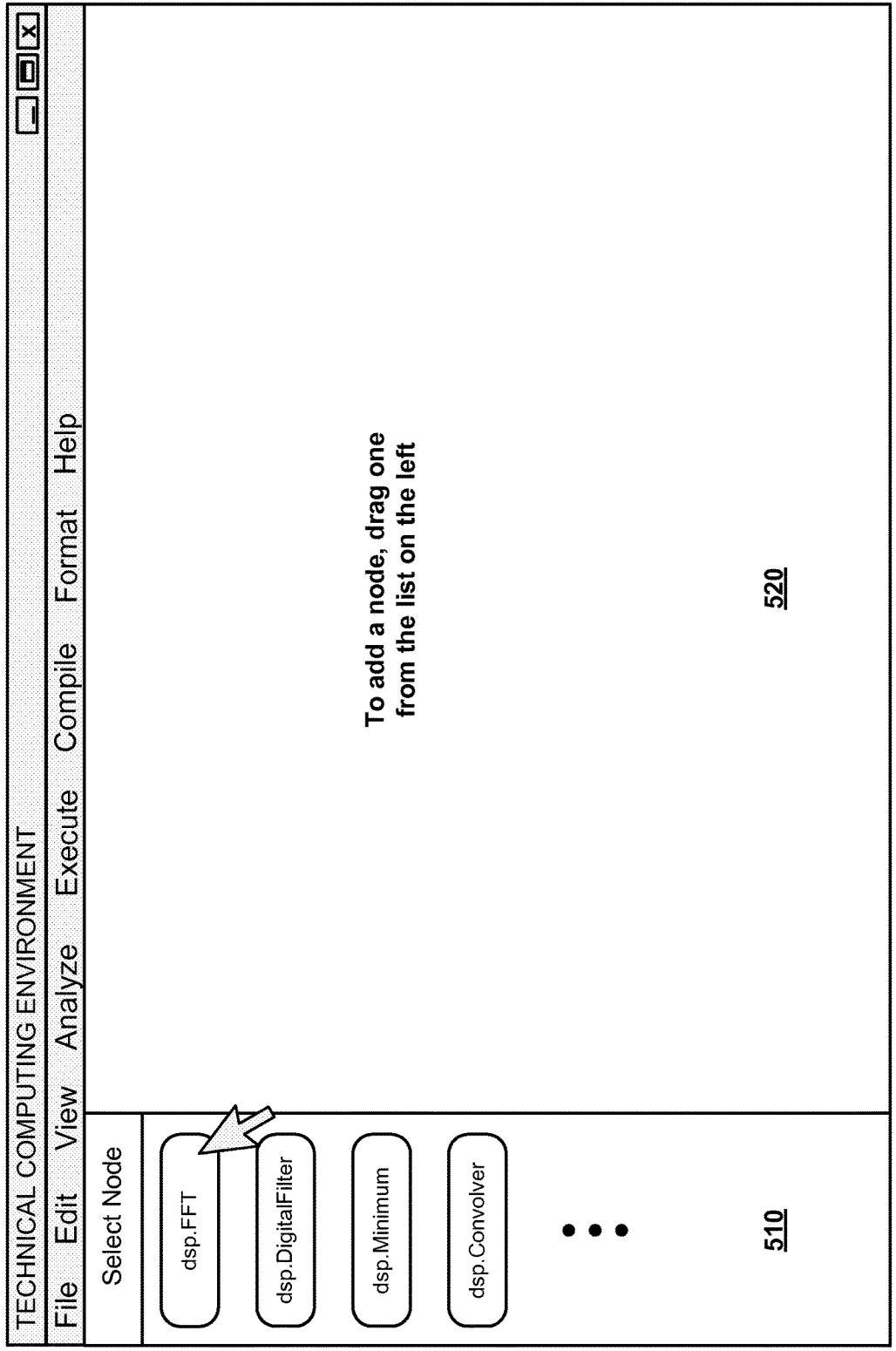

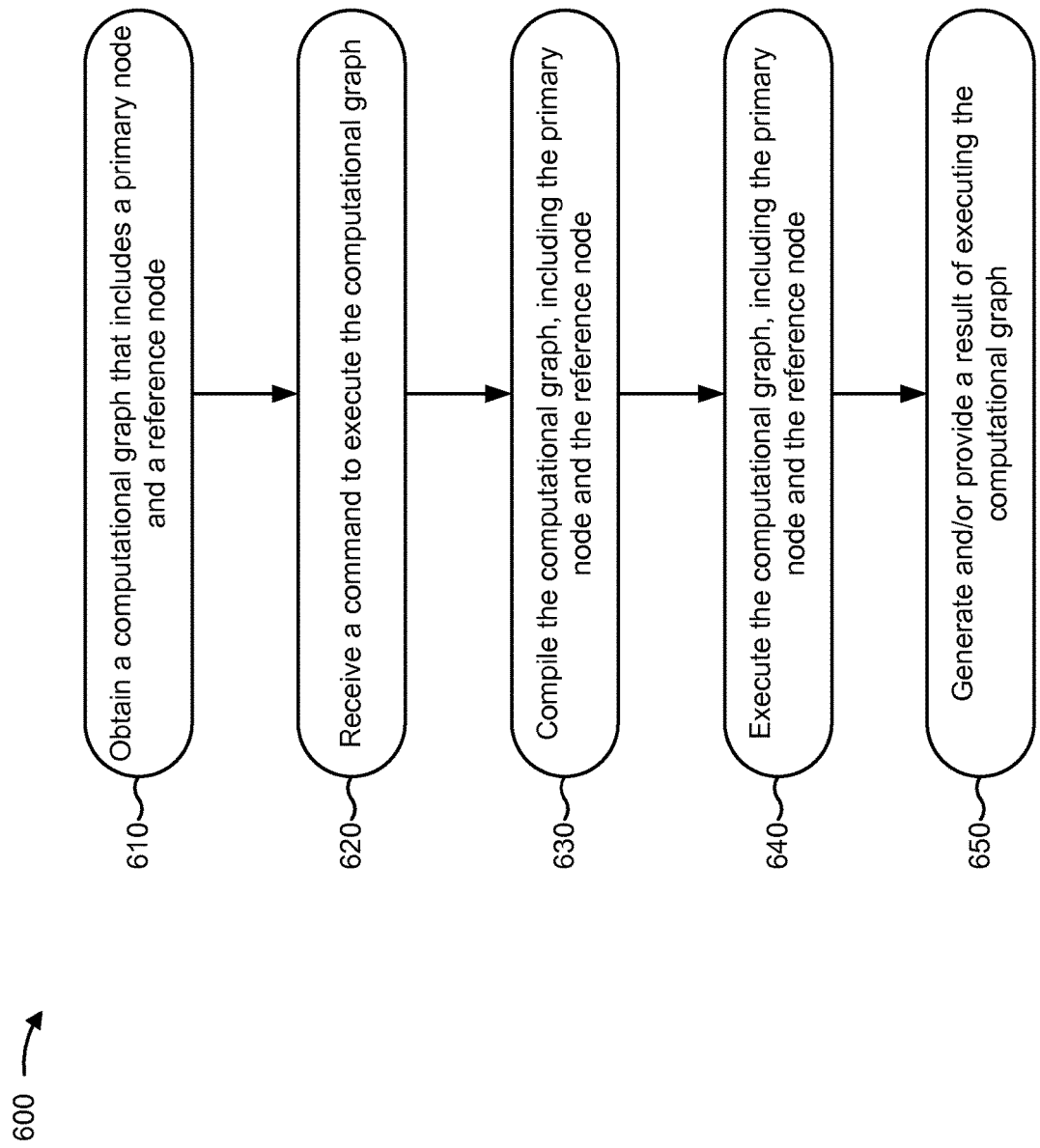

REFERENCE NODES IN A COMPUTATIONAL GRAPH

BRIEF DESCRIPTION OF THE DRAWINGS

FIG. 4 is a flow chart of an example process for creating a computational graph that includes primary computational nodes and reference computational nodes;

FIGS. 5A-5E are diagrams of an example implementation relating to the example process shown in FIG. 4;

FIG. 6 is a flow chart of an example process for compiling and executing a computational graph that includes primary and reference nodes;

DETAILED DESCRIPTION

The following detailed description of example implementations refers to the accompanying drawings. The same reference numbers in different drawings may identify the same or similar elements.

A computational graph may be configured to implement a dynamic system (e.g., a mechanical device, an electrical device, a human organ, a physical phenomena, etc.). The computational graph may generally correspond to a representation of interconnected computational nodes, where data dependencies, timing, ordering, and manners in which data is shared between computational nodes are well defined. A computational node may represent a computation implemented in the system (e.g., an element, of the system, that performs an operation associated with the computation), such as a computation performed on an input to generate an output.

Due to design constraints associated with computational graphs, a designer that wants to design a computational graph with a computational node that performs multiple operations must typically design the computational graph such that the computational node performs a first operation in a first iterative execution of the graph, a second operation in a second iterative execution of the graph, etc. Implementations described herein introduce reference nodes to computational graphs, where a reference node allows a designer to construct a computational graph capable of executing multiple operations, associated with a single computation, in a single iteration of the graph. Such computational graphs may be divided into segments that are executed in parallel (e.g., multi-threaded execution), are executed at different rates (e.g., multi-rate execution), and/or are executed using different algorithms, thereby increasing efficiency of computational graph execution.

Figure 1:
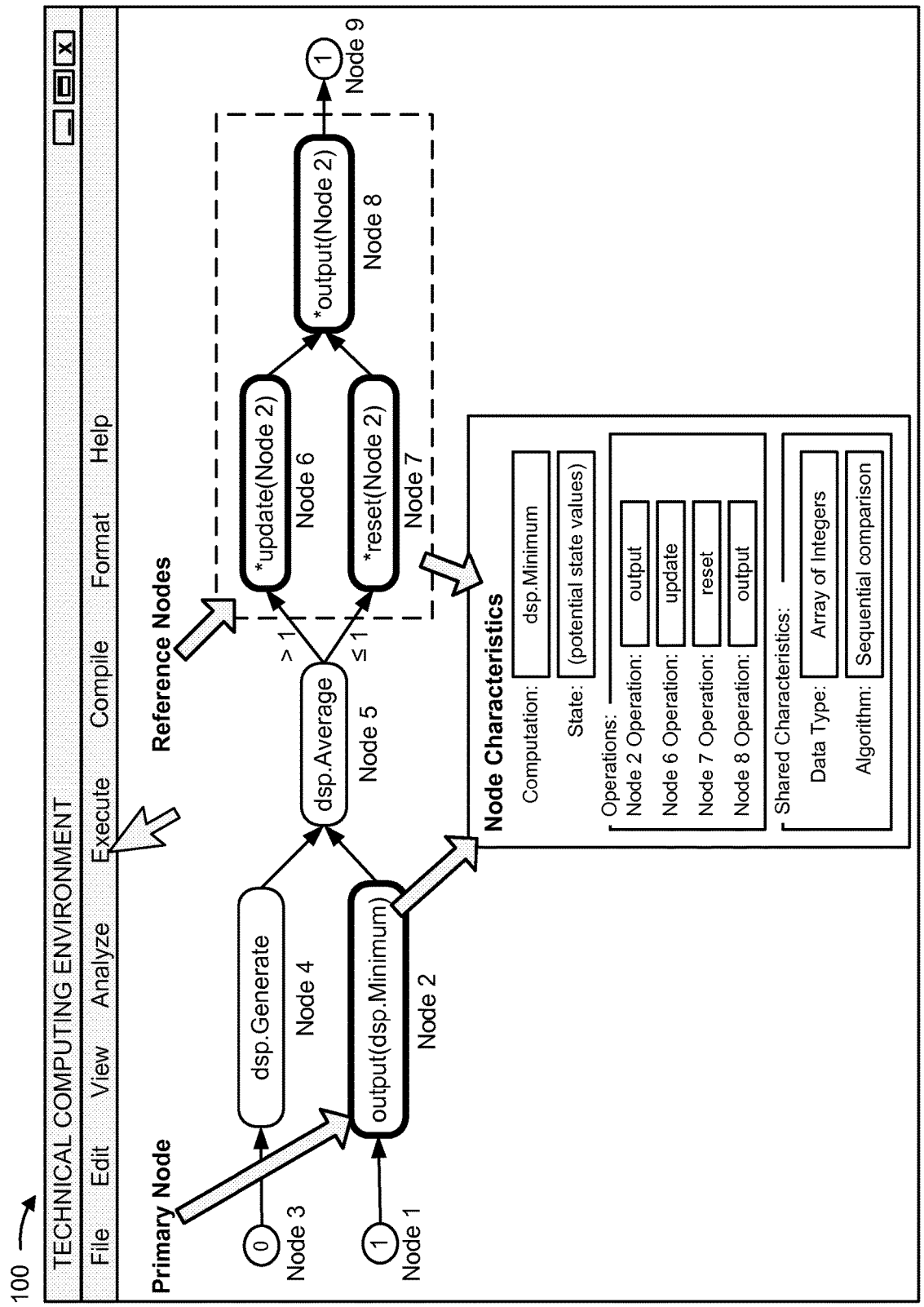
FIG. 1 is a diagram of an overview of an example implementation described herein.

FIG. 1 is a diagram of an overview of an example implementation 100 described herein. As shown in FIG. 1, a designer may interact with a technical computing environment (TCE) to design a computational graph that includes a primary computational node (sometimes referred to herein as a "primary node") and a reference computational node (sometimes referred to herein as a "reference node"), and/or multiple primary nodes and reference nodes. The computational graph may represent a system (e.g., an electronic circuit, a digital circuit, etc.), and the primary node and the reference node(s) may represent the same element of the system (e.g., a filter, a transfer function, a random number generator, etc.). For example, the primary node and the reference node(s) may represent a computation performed by the system (e.g., filtering of an input to generate an output, applying a function to an input to generate an output, generating a random number output based on receiving an input signal, etc.).

As further shown in FIG. 1, the primary node and the reference node(s) may be associated with node characteristics. The node characteristics may include, for example, a computation represented by both the primary node and the reference node(s), a state of the computation (e.g., a value of the state (a state value), potential values of the state, etc.), and an operation, associated with the computation, performed by the nodes. Executing a node may cause the operation, associated with the node, to be performed, which may modify the state value of the computation. The node characteristics may also include, for example, shared parameters of the primary node and the reference node(s). The shared parameters may control a manner in which the computation and/or operation is performed, such as a data type associated with inputs to or outputs from the computation, an algorithm (e.g., a series of steps) performed by the computation, etc.

When execution of the primary node causes a change in the state of the computation, then the state will also be changed for associated reference node(s). Similarly, when execution of a reference node causes a change in the state of the computation, then the state will also be changed for the primary node and other associated reference nodes. Referring to FIG. 1, when execution of related nodes 2, 6, 7, or 8 causes a state associated with the nodes to be changed, the state will also be changed for the other, non-executed nodes. For example, when the "update" operation of reference node 6 (e.g., update(Node2)) modifies the state associated with the computation represented by node 6 (e.g., dsp.Minimum), the state is also modified for Nodes 2, 7, and 8. In some implementations, the state associated with the computation may be a single shared state that is referenced by each of the primary node and the reference node(s). Alternatively, each node may be associated with a separate, distributed copy of the state.

In this way, the computational graph may execute multiple operations, associated with the same computation, in a single graph iteration. Furthermore, implementations described herein enable a graph to conditionally execute optional operations on a node by including additional references to the node in the graph. Additionally, implementations described herein remove the need for a single node to offer multiple input ports representing all possible functions, each of which would be triggered by input signals connecting to the single node. Using multiple input ports on a node increases the likelihood of forming cycles or feedback loops in the graph, due to connections later in the graph looping back to the node earlier in the graph, which creates execution problems for the graph. Implementations described herein allow a user to segment the computational graph into portions that are executed in parallel (e.g., different nodes being processed in parallel by different processors), and/or are executed at different rates (e.g., a first node being executed once every second, and a second node being executed once every minute), thereby increasing efficiency of computational graph execution.

Figure 2:
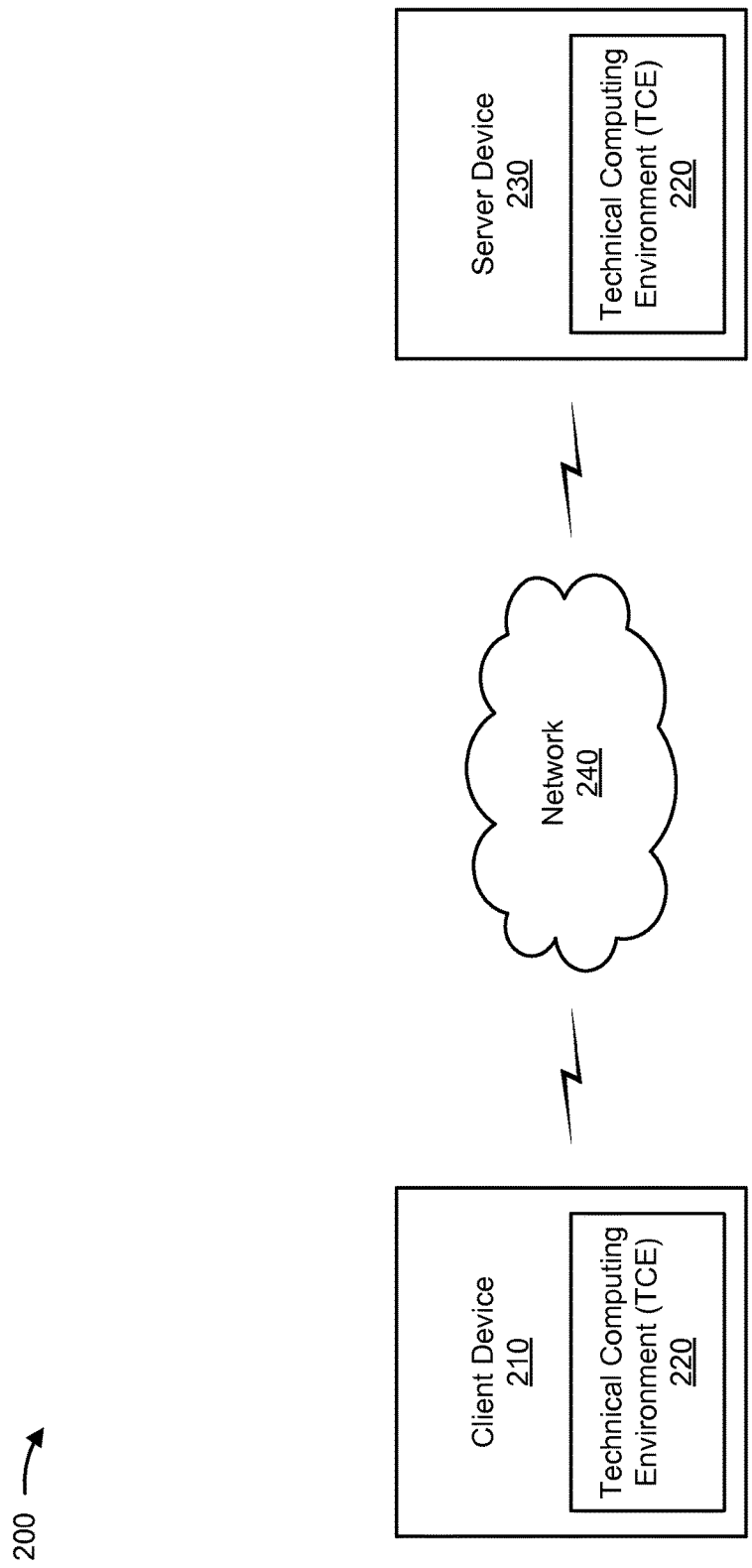
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include a device capable of receiving, generating, storing, processing, executing, and/or providing a model, such as a computational graph. For example, client device 210 may include a computing device (e.g., a desktop computer, a laptop computer, a tablet computer, a handheld computer, a server, etc.), a mobile phone (e.g., a smart phone, a radiotelephone, etc.), or a similar device. In some implementations, client device 210 may receive information from and/or transmit information to server device 230 (e.g., a computational graph and/or information associated with a computational graph).

Client device 210 may host TCE 220. TCE 220 may include any hardware-based logic or a combination of hardware and software-based logic that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment. Thus, while the description below focuses on a graphically-based environment, systems and/or methods, described herein, are equally applicable to text-based environments and hybrid environments.

TCE 220 may be integrated with or operate in conjunction with a graphical modeling environment, which may provide graphical tools for constructing computational graphs, systems, or processes. TCE 220 may include additional tools, such as tools designed to convert a computational graph into an alternate representation, such as program code, source computer code, compiled computer code, and/or a hardware description (e.g., a description of a circuit layout). In some implementations, TCE 220 may provide this ability using graphical toolboxes (e.g., toolboxes for signal processing, image processing, color manipulation, data plotting, parallel processing, etc.). In some implementations, TCE 220 may provide these functions as block sets. In some implementations, TCE 220 may provide these functions in another way.

A computational graph generated using TCE 220 may include, for example, any equations, assignments, constraints, computations, algorithms, and/or process flows. The computational graph may be implemented as, for example, time-based block diagrams (e.g., via the Simulink software), discrete-event based diagrams (e.g., via the SimEvents software), dataflow diagrams, state transition diagrams (e.g., via the Stateflow software), software diagrams, a textual array-based and/or dynamically typed language (e.g., via the MATLAB software), a list or tree, and/or another form. A computational graph generated using TCE 220 may include, for example, a model of a physical system, a computing system, an engineered system, an embedded system, a biological system, a chemical system, etc.

A computational node in the computational graph may include, for example, a function in a TCE environment (e.g., a MATLAB function), an object in a TCE environment (e.g., a MATLAB system object), a block in a graphically-based environment (e.g., a Simulink block, a LabView block, an Agilent VEE block, an Agilent ADS block, an Agilent Ptolemy block, etc.), or the like.

TCE 220 may schedule and/or execute a computational graph using one or more computational resources, such as one or more central processing units (CPUs) or cores, one or more field programmable gate arrays (FPGAs), one or more graphics processing units (GPUs), and/or other elements that can be used for computation. TCE 220 may include a compiler that may be used to schedule the computational nodes of the computational graph, allocate hardware resources, such as memory and CPUs, to the computational nodes and to the connections that interconnect the computational nodes, or the like.

Server device 230 may include one or more devices capable of receiving, generating, storing, processing, executing, and/or providing a computational graph and/or information associated with a computational graph. For example, server device 230 may include a computing device, such as a server, a desktop computer, a laptop computer, a tablet computer, a handheld computer, or a similar device. In some implementations, server device 230 may host TCE 220.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional, fewer, different, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
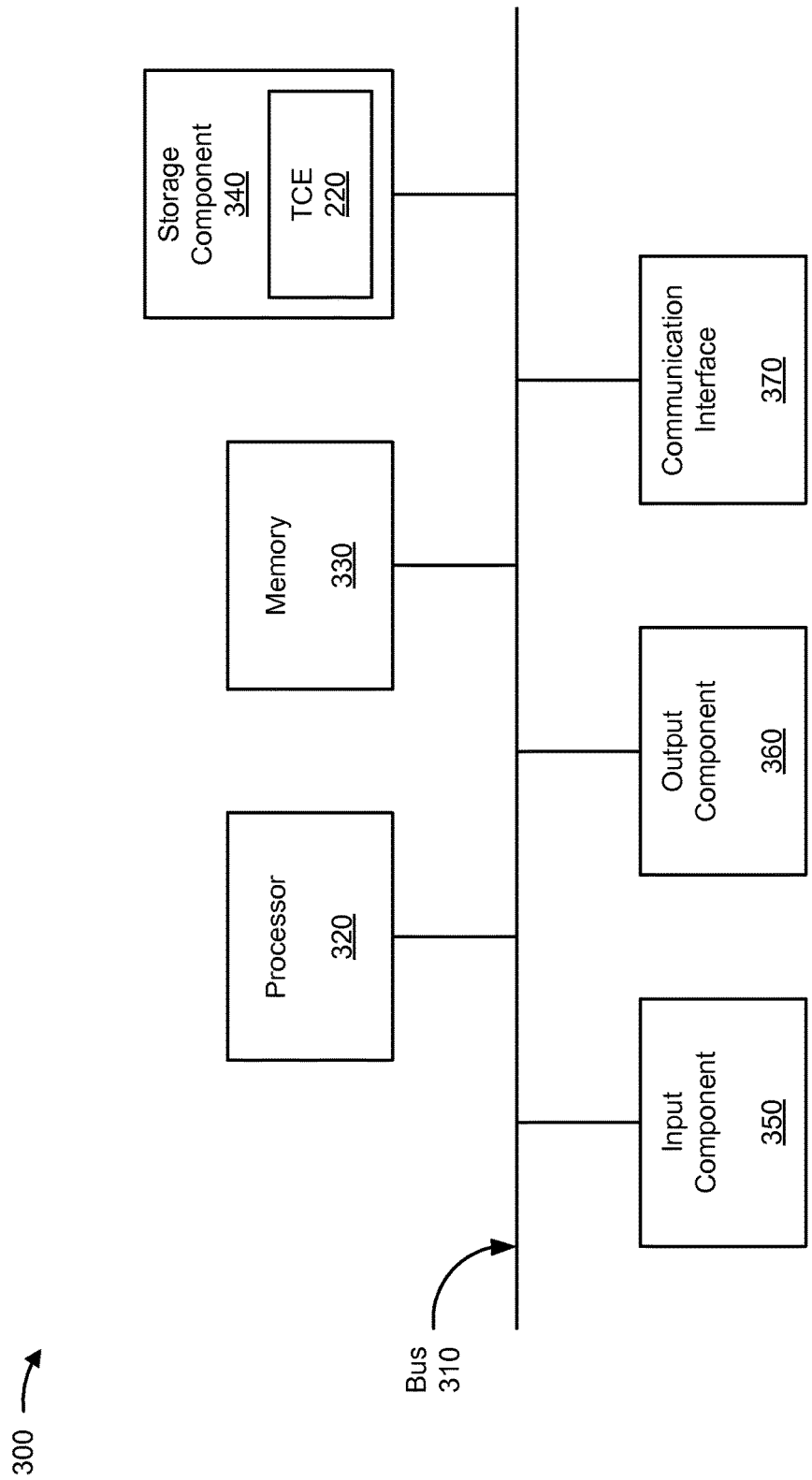
FIG. 3 is a diagram of example components of one or more devices of FIG. 2.

FIG. 3 is a diagram of example components of a device 300, which may correspond to client device 210 and/or server device 230. In some implementations, each of client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing logic (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, or the like.

Device 300 may perform various operations described herein. Device 300 may perform these operations in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional, fewer, different, or differently arranged components than those shown in FIG. 3. Additionally, or alternatively, one or more components of device 300 may perform one or more functions described as being performed by another one or more components of device 300.

FIG. 4 is a flow chart of an example process 400 for creating a computational graph that includes primary computational nodes and reference computational nodes. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include receiving information that identifies a primary node to be included in a computational graph (block 410). For example, a user may cause client device 210 (e.g., TCE 220) to create or open a user interface. The user interface may not include any primary nodes. The user may then add primary nodes to the user interface. For example, in some implementations, client device 210 may receive a command, from the user, that indicates that a primary node is to be added to the user interface. Client device 210 may receive the command based, for example, on detecting a selection of a particular menu item, entry of a particular textual or audible input from the user, and/or entry of some other predetermined input that indicates a desire to add a primary node to the user interface. Based on the command, client device 210 may add the primary node to the user interface. For example, client device 210 may add the primary node to a computational graph represented via the user interface.

As further shown in FIG. 4, process 400 may include receiving characteristics of the primary node (block 420). For example, client device 210 (e.g., TCE 220) may provide a user interface, to the user, that allows the user to specify characteristics to be associated with each added primary node. The characteristics may include, for example, a computation associated with the primary node (e.g., a computation performed by an underlying system element), a state associated with the primary node (e.g., one or more state values and/or potential states that the computation is capable of storing), an operation associated with the primary node (e.g., an operation that, when executed by client device 210, generates an output from an input, and/or modifies a state value of the computation), or the like.

Additionally, or alternatively, the characteristics may include a shared parameter of the primary and reference node(s) (e.g., a parameter common to the primary and reference node(s)). The shared parameters may influence a manner in which the computation and/or operation is performed, when the primary and/or reference node(s) are executed by client device 210. For example, the shared parameter may include a data type (e.g., a data type of an input to the node, an output from the node, etc.), an execution speed of the node (e.g., a high fidelity execution that causes a slower execution speed than a low fidelity execution), a value used to perform the computation and/or operation (e.g., a coefficient value, a gain value, etc.), a dimensionality of the value (e.g., an array dimension), a complexity of the value (e.g., a complex number or a real number), an algorithm (e.g., a series of steps) performed by the computation and/or operation, or the like.

In some implementations, an operation associated with a node may include a setup operation (e.g., to initialize a state of the computation, such as by setting the state to an initial value), a step operation (e.g., to execute an operation associated with the node, which may modify the state value), a terminate operation (e.g., to perform operations associated with finishing a final iterative execution of the computational graph, such as setting a state to a terminal value), or the like. A step operation may include, for example, an output operation, an update operation, a reset operation, or the like. An output operation may output a value generated by performing the computation. An update operation may modify a state value associated with the computation. A reset operation may set a state to a default value.

In some implementations, client device 210 may allow the user to specify characteristics in another manner. For example, client device 210 may allow the user to specify another node of the computational graph from which the characteristics (e.g., shared parameters) are to be obtained. As another example, client device 210 may allow the user to specify a particular file that includes the characteristics that are to be used for the primary node.

As further shown in FIG. 4, process 400 may include receiving information that identifies a reference node, associated with the primary node, to be included in the computational graph (block 430). For example, a user may cause client device 210 (e.g., TCE 220) to create or open a user interface that includes a representation of a primary node. The user may then add a reference node, associated with the primary node, to the user interface. In some implementations, client device 210 may receive a command, from the user, that indicates that a reference node, associated with a primary node, is to be added to the user interface. Client device 210 may receive the command based, for example, on detecting a selection of a particular primary node, and detecting a further selection of a particular menu item, a particular textual or audible input from the user, and/or some other predetermined input that indicates a desire to add a reference node, associated with the particular primary node, to the user interface. Based on the command, client device 210 may add the reference node to the user interface. For example, client device 210 may add the reference node to a computational graph that includes the primary node.

Additionally, or alternatively, the user may provide, to client device 210, an indication of a set of nodes that represent a single, shared computation (e.g., an underlying dynamic system). The user may further provide an indication of one node, of the set of nodes, to be designated as the primary node. Client device 210 may designate a primary node and reference node(s), of the set of nodes, based on the user indications. The designation of a primary node may aid in the interpretation of the computational graph by a user. For example, client device 210 may distinguish between the primary node and the reference node(s) on a user interface. In some implementations, client device 210 may store the shared computation in a memory location associated with the primary node and/or the reference node(s).

As further shown in FIG. 4, process 400 may include receiving characteristics of the reference node (block 440). For example, client device 210 (e.g., TCE 220) may provide a user interface, to the user, that allows the user to specify characteristics to be associated with each added reference node. The characteristics may include, for example, any of the characteristics described above with respect to block 420 (e.g., associated with the primary node).

In some implementations, client device 210 may determine a characteristic of a reference node based on a corresponding characteristic (e.g., a shared parameter) of a corresponding primary node that is associated with the reference node. For example, the primary node and the reference node may share a computation, a state (e.g., a state value and/or potential states), an operation, and/or a parameter that influences a manner in which the computation and/or operation is performed. Additionally, or alternatively, a node may only be considered a reference node of a primary node when the reference node and the primary node share the same computation and state (e.g., a state value).

In some implementations, client device 210 may allow the user to specify characteristics in another manner. For example, client device 210 may allow the user to specify characteristics, associated with a primary node, that are to also be characteristics of a reference node (e.g., shared parameters). Additionally, or alternatively, client device 210 may allow the user to specify characteristics, associated with a first reference node, that are to also be characteristics of a second reference node.

As further shown in FIG. 4, process 400 may include receiving information relating to a connection between the primary node and the reference node, to form the computational graph (block 450). For example, client device 210 (e.g., TCE 220) may allow the user to specify how a primary node, a reference node, and other nodes are to be connected. In some implementations, client device 210 may allow the user to connect a particular output port of one node to an input port of another node. In some implementations, client device 210 may allow the user to connect an output port to an input port using a drawing tool (e.g., where the user may draw a line from the output port of the one node to the input port of the other node). In some implementations, client device 210 may provide a user interface that allows the user to specify, for a connection, the output port of the one node and the input port of the other node. Client device 210 may allow the user to specify a connection between nodes in other ways. The connections may indicate shared values between connected nodes (e.g., a value output from one node may be an input value to another node).

In some implementations, the computational graph may include a first primary node associated with one or more first reference nodes, a second primary node associated with one or more second reference nodes, etc. Additionally, or alternatively, the computational graph may include other nodes that are not primary or reference nodes (e.g., that are not associated with a same computation and/or state as another node in the computational graph). Additionally, or alternatively, the computational graph may include graph inputs and graph outputs. Some of the graph inputs may be independent, and some of the graph inputs may depend on a graph output. A user may specify connections between the graph input(s), the primary node(s), the reference node(s), the other node(s), and the graph output(s).

In some implementations, client device 210 may receive a first computational graph that includes a feedback loop (e.g., a cyclic graph), and does not include primary and/or reference nodes. Client device 210 may convert the first computational graph into a second computational graph that does not include the feedback loop (e.g., an acyclic graph), and that includes a primary node and a reference node. For example, client device 210 may replace a node (e.g., a step operation in the feedback loop) in the first computational graph with a primary node (e.g., an output operation) and a reference node (e.g., an update operation) to form the second computational graph. In some implementations, client device 210 may perform the conversion based on user input that identifies the first computational graph, the feedback loop, and/or a node to be converted to a primary node and a reference node.

As further shown in FIG. 4, process 400 may include storing the computational graph (block 460). For example, client device 210 (e.g., TCE 220) may store the computational graph in a memory location. In some implementations, client device 210 may receive information, identifying a memory location, from the user, and may store the computational graph at the identified memory location.

While a series of blocks has been described with regard to FIG. 4, the blocks and/or the order of the blocks may be modified in some implementations. Additionally, or alternatively, non-dependent blocks may be performed in parallel.

Figure 5B:
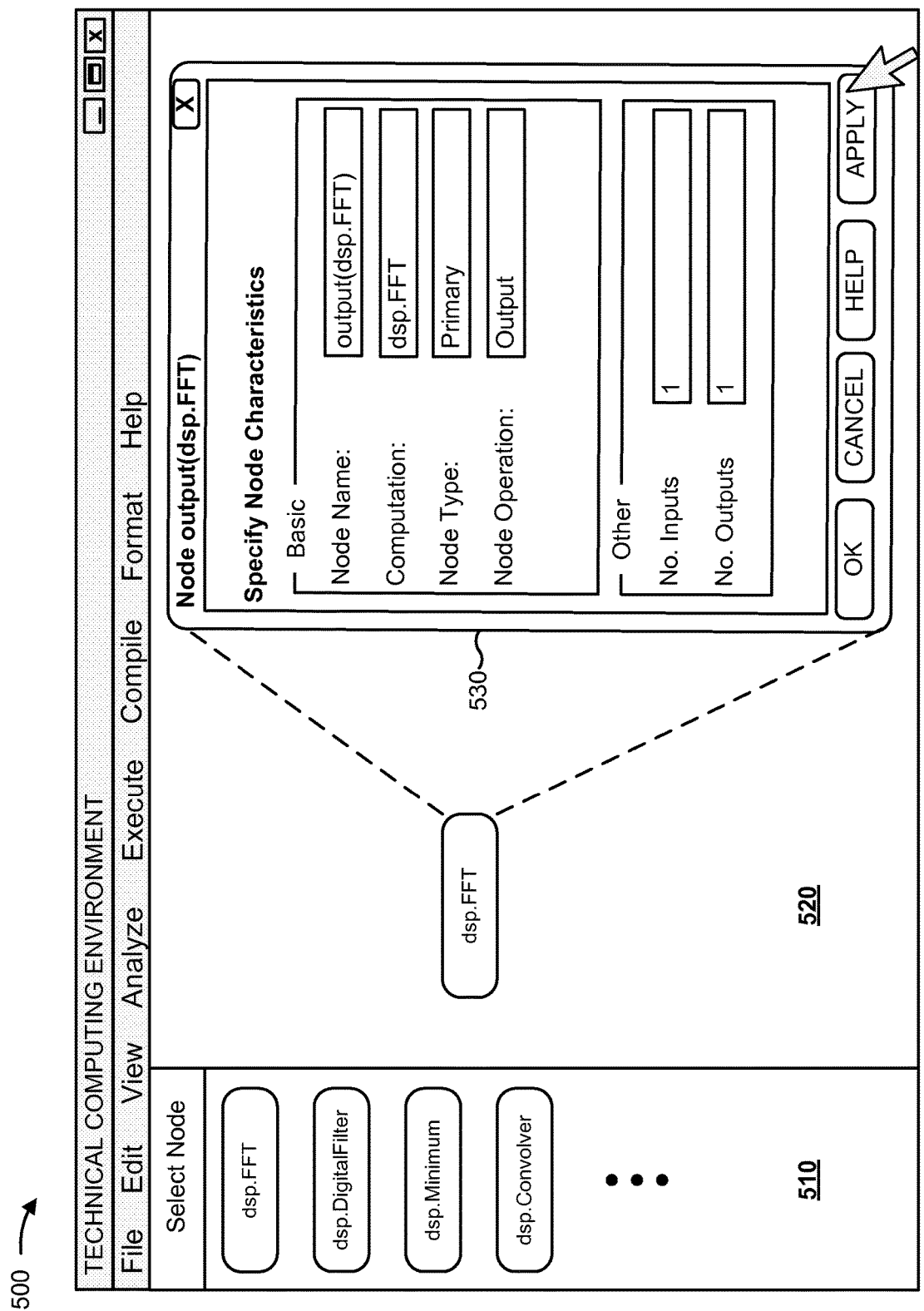

FIGS. 5A-5E are diagrams of an example implementation 500 relating to example process 400 shown in FIG. 4. As shown in FIG. 5A, client device 210 may provide a user interface that includes a first area 510 and a second area 520. First area 510 may provide a list of primary nodes from which the user may select. The primary nodes may be pre-configured with particular characteristics. For example, the primary node, identified as "dsp.FFT" may correspond to a primary node that performs operations associated with a fast Fourier transform (FFT) computation, when executed. Similarly, the primary nodes identified as "dsp.DigitalFilter," "dsp.Minimum," and "dsp.Convolver" may correspond to primary nodes that perform operations associated with a filtering computation, a minimum value determination computation, and a convolution computation, respectively, when executed.

Second area 520 may act as a blank canvas for receiving primary nodes and/or constructing a computational graph. To add a primary node, the user may drag the desired primary node from first area 510 to second area 520. Assume, for example implementation 500, that the user drags the "dsp.FFT" primary node to second area 520, as shown in FIG. 5B. Based on adding the "dsp.FFT" primary node to second area 520, client device 210 may cause a user interface 530 to be provided to the user.

User interface 530 may allow the user to specify characteristics of the added primary node. As shown, user interface 530 may allow the user to specify a name for the primary node, a computation associated with the primary node, a node type of the primary node (e.g., whether the node is a primary node, a reference node, or another type of node), an operation performed when the primary node is executed, a quantity of input ports associated with the primary node, a quantity of output ports associated with the primary node, and/or other node characteristics.

Figure 5C:
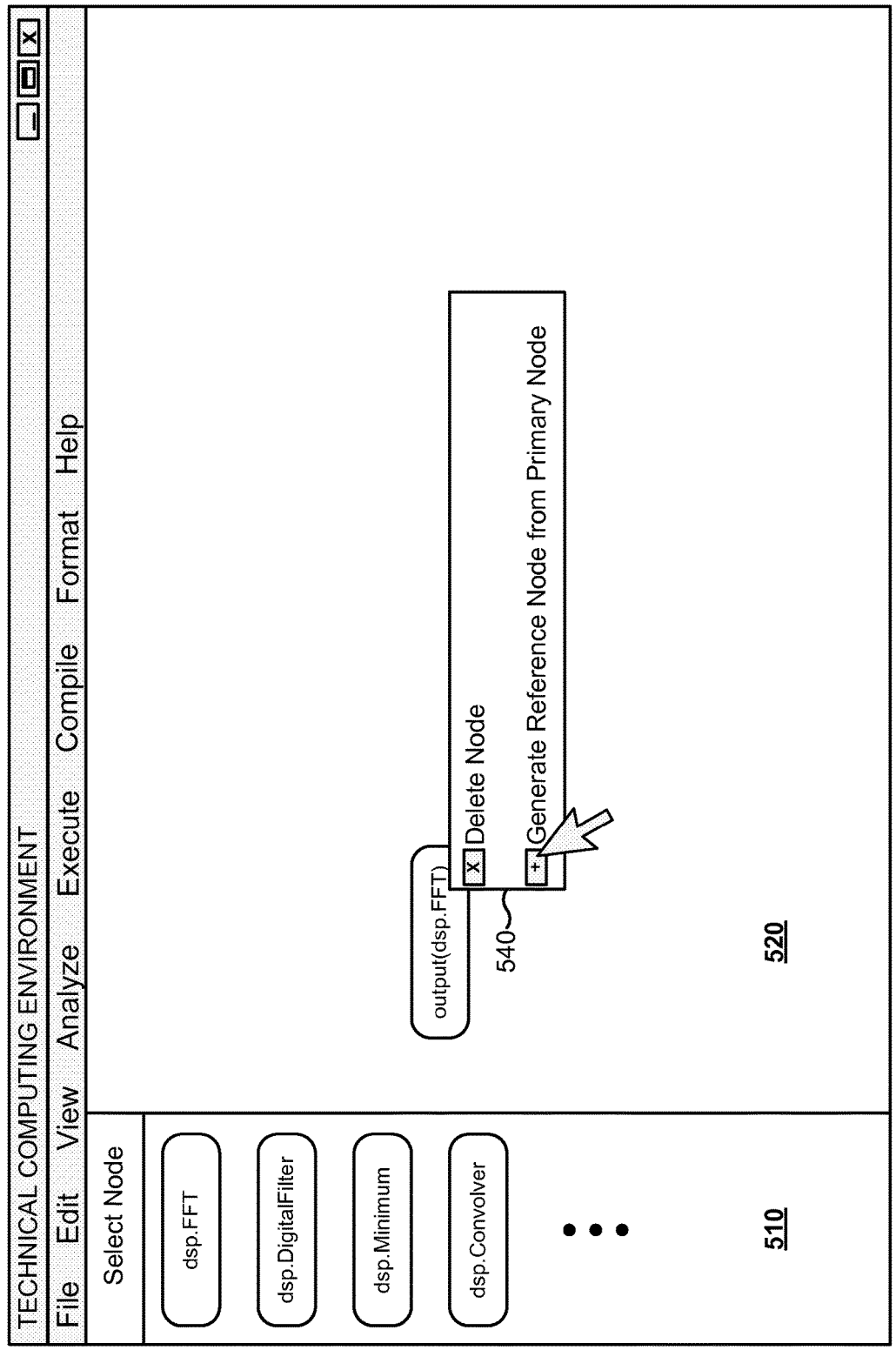
Figure 5D:
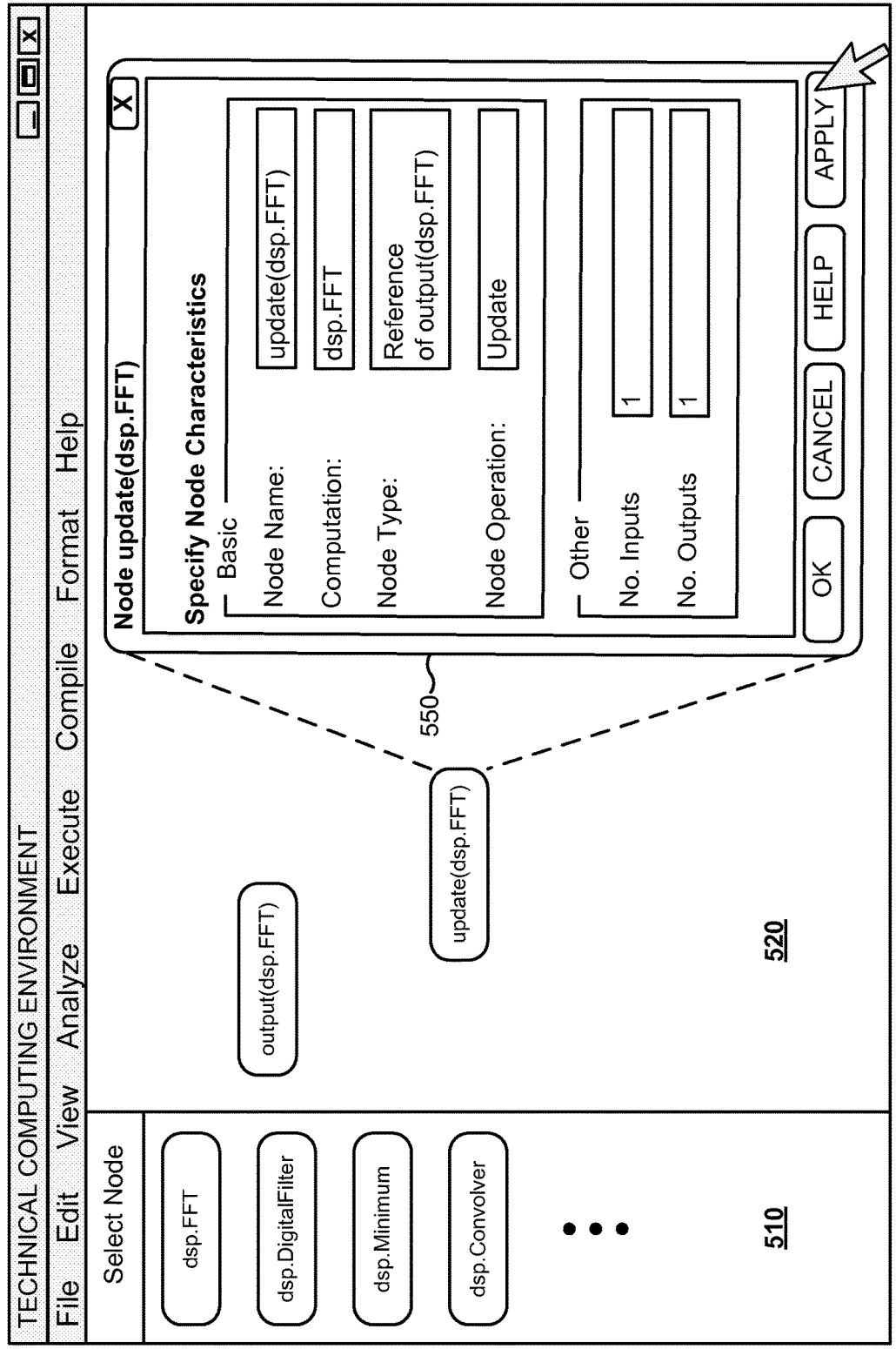

Once a user has specified the desired characteristics, client device 210 may display the newly added primary node, having the desired characteristics, in second area 520, as shown in FIG. 5C as "output(dsp.FFT)." As further shown in FIG. 5C, the user may interact with the primary node to cause client device 210 to provide a user interface 540 to be provided to the user. User interface 540 may allow the user to add a reference node, associated with the primary node, to second area 520, as shown in FIG. 5D as "update (dsp.FFT)." Based on adding the reference node to second area 520, client device 210 may cause a user interface 550 to be provided to the user.

User interface 550 may allow the user to specify characteristics of the added reference node. As shown, user interface 550 may allow the user to specify a name for the reference node, a computation associated with the reference node, a node type of the reference node, an operation performed when the reference node is executed, a quantity of input ports associated with the reference node, a quantity of output ports associated with the reference node, and/or other node characteristics. In some implementations, one or more characteristics of the reference node (e.g., node type, computation, state(s), shared parameters) may be automatically determined based on the primary node from which the reference node was generated. Additionally, or alternatively, client device 210 may not permit the user to specify characteristics that are automatically determined based on the primary node.

Figure 5E:
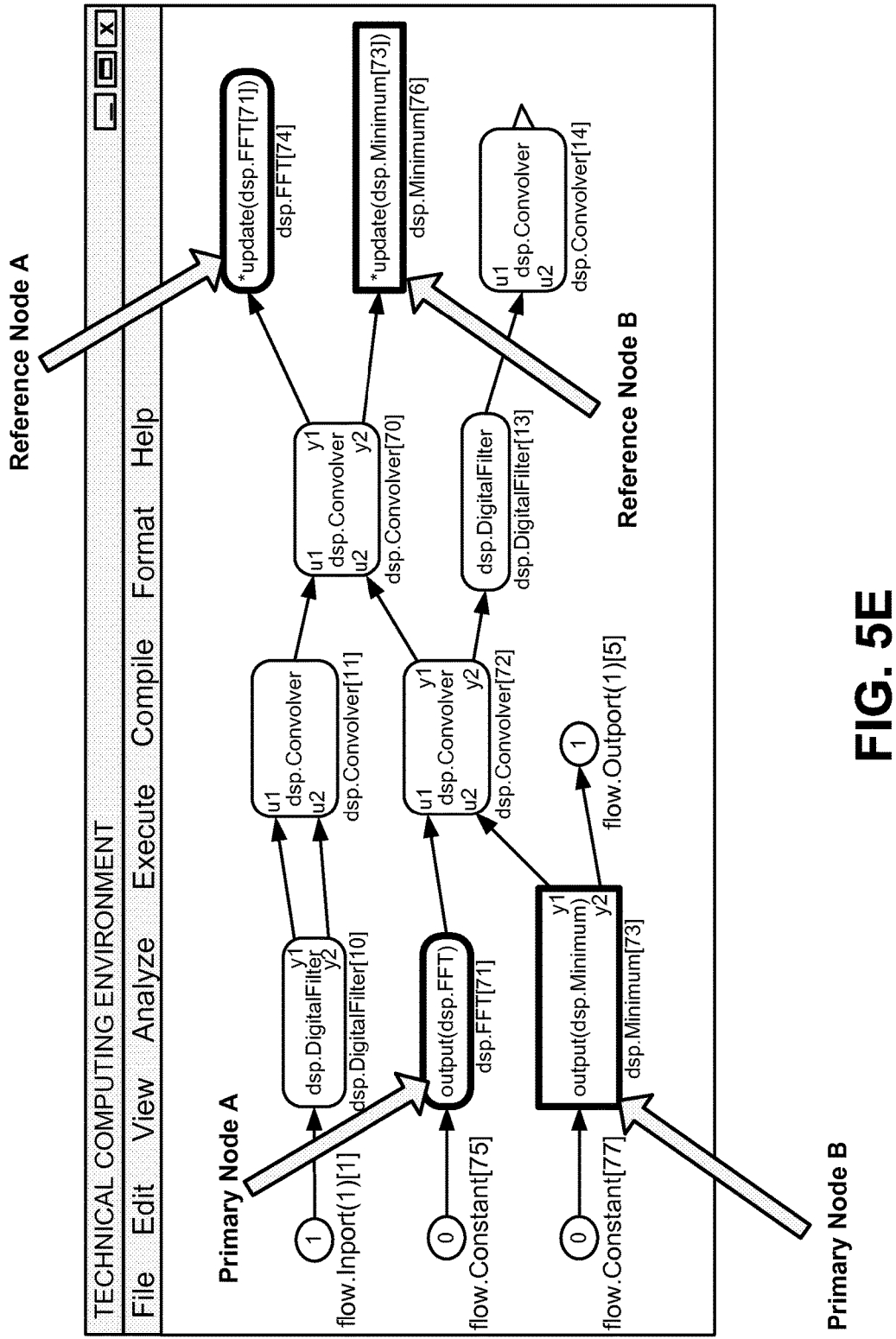

The user may continue to add primary nodes, reference nodes, and other nodes into second area 520 (e.g., by dragging the nodes from another area, by generating the nodes from existing nodes, by providing other input to add the nodes, etc.), and may connect the nodes in a desired manner, until the desired quantity and arrangement of nodes has been achieved, to form a computational graph, as shown in FIG. 5E.

As shown in FIG. 5E, the user may create a computational graph with a first primary node, identified as "Primary Node A," that corresponds to a first reference node, identified as "Reference Node A." Client device 210 may provide, via the user interface, an indication that a particular node is a reference node. For example, Reference Node A is represented with an asterisk (*) in front of an operation identifier of Reference Node A, to indicate that Reference Node A is a reference node. The operation identifier may represent an operation performed when Reference Node A is executed. For example, "update" represents that Reference Node A performs an update operation when executed.

Additionally, or alternatively, client device 210 may provide, via the user interface, an indication of a primary node associated with a reference node. For example, Primary Node A and Reference Node A may be outlined and/or highlighted in a similar manner, as shown. Furthermore, Reference Node A is represented with the text "*update (dsp.FFT[71])", which represents that Reference Node A performs an update operation on the dsp.FFT computation associated with Node 71 (e.g., Primary Node A).

Client device 210 may provide a second primary node, identified as "Primary Node B," that corresponds to a second reference node, identified as "Reference Node B," in a similar manner, as shown. For example, Primary Node B and Reference Node B may be outlined in a similar manner to indicate that they are associated with one another. Furthermore, Reference Node B may be represented with the text "*update(dsp.Minimum[73])", which represents that Reference Node B performs an update operation on the dsp.Minimum computation associated with Node 73 (e.g., Primary Node B), when executed. In some implementations, the computational graph may include additional primary and/or reference nodes, and/or may include multiple reference nodes associated with a single primary node. Additionally, or alternatively, client device 210 may not provide a distinction between the primary and reference nodes, on the user interface.

FIG. 6 is a flow chart of an example process 600 for compiling and executing a computational graph that includes primary and reference nodes. In some implementations, one or more process blocks of FIG. 6 may be performed by client device 210. In some implementations, one or more process blocks of FIG. 6 may be performed by another device or a group of devices separate from or including client device 210, such as server device 230.

As shown in FIG. 6, process 600 may include obtaining a computational graph that includes a primary node and a reference node (block 610). For example, client device 210 (e.g., TCE 220) may receive a request, from a user of client device 210, to access a computational graph that includes a primary node and a reference node. The request may include information identifying the computational graph, such as a name of the computational graph, and information identifying a memory location at which the computational graph is stored. The memory location may be located within client device 210 or external to, and possibly remote from, client device 210. Client device 210 may, based on receiving the request, retrieve the computational graph from the memory location. In some implementations, client device 210 may provide, for display, a user interface that depicts all or a portion of the computational graph.

As further shown in FIG. 6, process 600 may include receiving a command to execute the computational graph (block 620). For example, client device 210 (e.g., TCE 220) may receive a command, from the user, to execute the computational graph. In some implementations, client device 210 may receive the command based on detecting a selection of a particular menu item, entry of a particular textual or audible input from the user, and/or entry of some other predetermined input that indicates a desire to execute the computational graph.

In some implementations, client device 210 may request that the user identify a particular execution platform on which all or a portion of the computational graph is to be executed. The particular execution platform may include, for example, a particular type of CPU, GPU, FPGA, ASIC, multi-core processor, a particular core or set of cores of multi-core processors, and/or another type of processing device. In some implementations, client device 210 may provide, based on receiving the command, a user interface to the user, which allows the user to identify a particular execution platform on which particular nodes in the computational graph (e.g., primary nodes and/or reference nodes) are to execute. Client device 210 may alternatively allow the user to specify a particular execution platform in other ways.

Additionally, or alternatively, client device 210 may request that the user identify a particular rate at which all or a portion of the computational graph is to be executed. For example, client device 210 may execute a first portion of the graph at a first rate (e.g., once every second), and may execute a second portion of the graph at a second rate (e.g., once every minute). In some implementations, client device 210 may provide, based on receiving the command, a user interface to the user, which allows the user to identify a particular rate at which particular nodes in the computational graph (e.g., primary nodes and/or reference nodes) are to execute. Client device 210 alternatively may allow the user to specify a particular execution rate in other ways.

As further shown in FIG. 6, process 600 may include compiling the computational graph, including the primary node and the reference node (block 630). For example, client device 210 (e.g., TCE 220) may compile the computational graph upon detection of a command to execute the computational graph. In some implementations, compiling the computational graph may include determining a manner in which the nodes are connected (e.g., which outputs are connected to which inputs), determining characteristics associated with connections and/or nodes of the graph (e.g., a data type, a dimensionality, a complexity, etc.), assigning memory locations to particular nodes and/or connections, determining computations that are actually going to be executed, designating an order in which the nodes are going to be executed (e.g., scheduling the graph based on semantic rules, such as a synchronous data flow rule, a dynamic data flow rule, a Boolean data flow rule, a Kahn process network rule, a Petri net rule, a discrete event system rule, etc.), determining a buffer allocation and/or allocating buffer space associated with graph execution (e.g., determining and/or allocating a number and/or size of data buffers for graph nodes and/or connections), determining time delays associated with the nodes, determining memory consumption and/or memory accesses associated with the nodes, and/or determining other information relating to size, performance, or ordering of nodes in the computational graph.

In some implementations, compiling the computational graph may include identifying primary node(s) and/or reference node(s) included in the computational graph. Additionally, or alternatively, compiling the computational graph may include assigning nodes to computational resources for execution and/or setting a rate at which nodes in the computational graph are to execute.

Additionally, or alternatively, compiling the computational graph may include generating program code for executing the computational graph. The program code may include program code describing the primary node(s) and/or the reference node(s). Additionally, or alternatively, the program code may include instructions for multi-rate execution (e.g., with different nodes being executed at different rates) and/or multi-thread execution (e.g., with different nodes being executed using different computational resources) of the computational graph. In some implementations, client device 210 may store the program code for later execution.

As further shown in FIG. 6, process 600 may include executing the computational graph, including the primary node and the reference node (block 640). For example, client device 210 (e.g., TCE 220) may, upon detection of a command to execute the computational graph, execute the computational graph. Executing the computational graph may include executing multiple nodes (e.g., the primary node and the reference node), associated with a single computation, in a single iteration of the computational graph execution. For example, executing the computational graph may include executing the primary node and the reference node, based on the computation, operation(s), shared parameter(s), state value(s), etc. associated with the primary node and/or the reference node.

Executing the computational graph may include executing multiple operations, such as a setup operation, one or more step operations, and/or a terminate operation, in a single iterative execution of the computational graph. Execution of the multiple operations may be permitted because the primary node and the reference node(s) refer to the same computation. When, on the other hand, each node in the computational graph refers to a different operation, the setup operation may be required to be performed during a first iteration of the graph, the step operations may be required to be performed in subsequent iterations of the graph, and the terminate operation may be required to be performed in a final iteration of the graph.

Execution of an operation (e.g., execution of the primary node or the reference node), by client device 210, may modify a state value associated with the primary node and the reference node. In some implementations, the state value may be a single value (or a single set of values), stored in a particular memory location that is associated with (e.g., read/write accessible during execution of) the primary node and the reference node. Client device 210 may modify the state value, stored in the particular memory location, when executing the primary node or the reference node. Alternatively, the state value may include multiple values (or multiple sets of values) that are identical copies of one another (e.g., multiple values that are the same). The multiple values may each be stored in a different memory location, and each memory location by be associated with a different node (e.g., a first memory location may be associated with the primary node, a second memory location may be associated with a reference node, a third memory location may be associated with another reference node, etc.). Client device 210 may modify each state value, stored in the different memory locations, when executing the primary node or the reference node(s).

In some implementations, two different nodes may cause a particular operation (e.g., a step operation), associated with a computation, to be performed twice, at different points in time during execution of a single iteration of the computational graph (e.g., based on a location of the nodes in the graph). Alternatively, the two different nodes may cause different operations (e.g., a step operation and a reset operation) to be performed at different points in time during execution of the single iteration. In some implementations, an operation may be performed based on a condition being met during execution of the computational graph. In some implementations, more than two operations may be executed in this manner.

In some implementations, client device 210 may execute the computational graph based on compiling the computational graph. For example, client device 210 may execute multiple operations, associated with a single computation, on different computational resources (e.g., multiple CPUs, GPUs, FPGAs, etc.), based on compilation of the computational graph (e.g., by executing different portions of generated program code using different computational resources). Additionally, or alternatively, client device 210 may execute the multiple operations at different execution rates, based on the compilation. For example, a first node may update a computation at a first rate (e.g., every 0.01 seconds), and a second node may output a result of performing the operation at a second rate (e.g., every 1.00 second).

As further shown in FIG. 6, process 600 may include generating and/or providing a result of executing the computational graph (block 650). For example, client device 210 may execute the computational graph to generate a result, and may provide the result. The result may include, for example, information determined during compilation of the computational graph. Additionally, or alternatively, the result may include information associated with execution of the nodes of the computational graph, such as information relating to states of a computation, iterations of the graph, etc.

In some implementations, client device 210 may stream changes in some or all the information obtained during compilation and/or execution of the computational graph. For example, if a state, associated with a particular node, changes during execution of the computational graph, client device 210 may provide the new information while the computational graph is executing.

While a series of blocks has been described with regard to FIG. 6, the blocks and/or the order of the blocks may be modified in some implementations. Additionally, or alternatively, non-dependent blocks may be performed in parallel.

Figure 7:
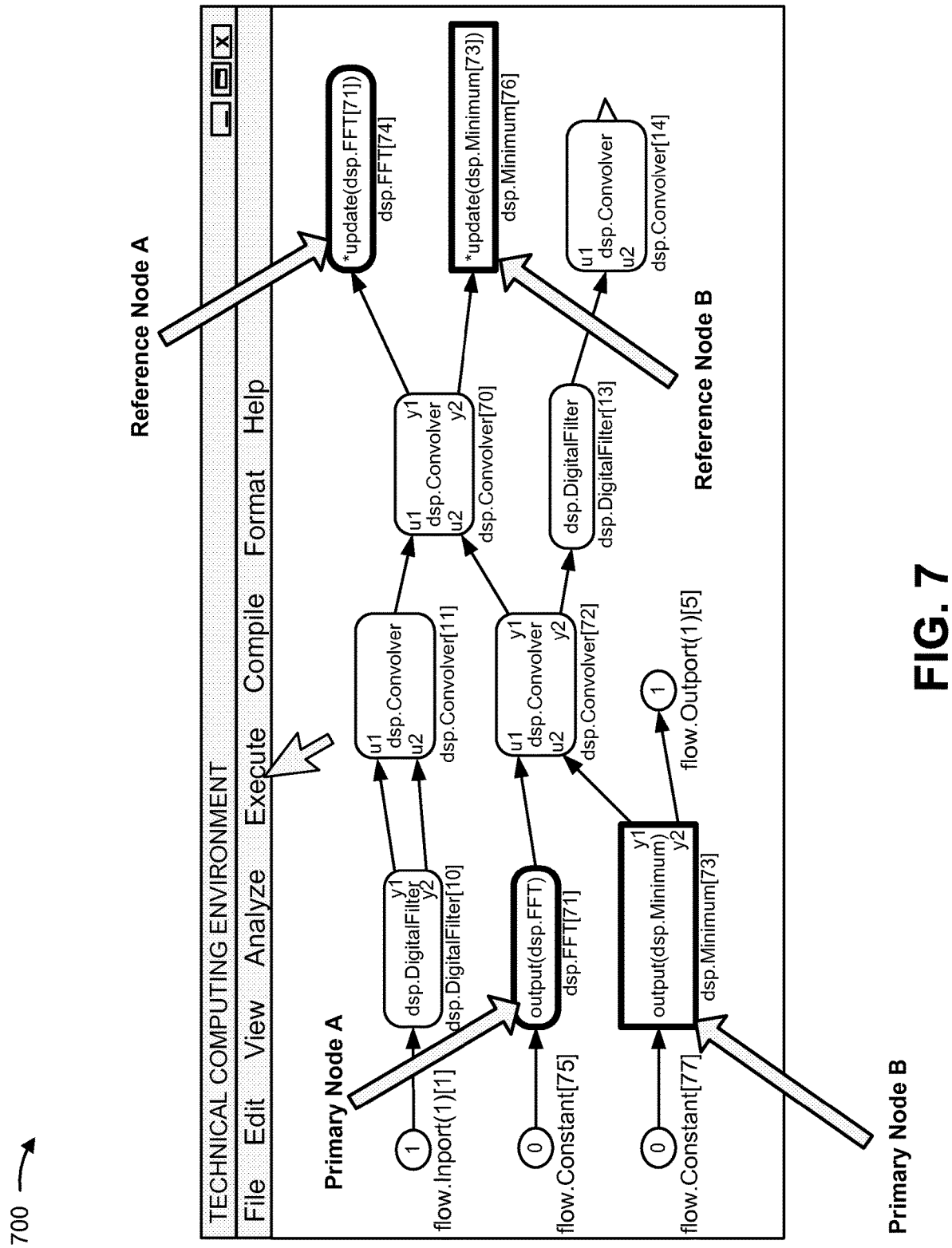
FIG. 7 is a diagram of an example implementation relating to the example process shown in FIG. 6.

FIG. 7 is a diagram of an example implementation 700 relating to example process 600 shown in FIG. 6. FIG. 7 depicts the computational graph generated as described herein in connection with example implementation 500 (FIGS. 5A-5E).

As shown in FIG. 7, a user may provide input, via a user interface, to execute the computational graph. Based on receiving the input, client device 210 (e.g., TCE 220) may compile the computational graph. Compiling the computational graph may include, for example, scheduling nodes in the computational graph for execution, such as by determining an execution order of the nodes. Client device 210 may number the nodes based on the execution order, and the numbers may be provided via the user interface (e.g., as shown by the numbers in brackets: [ ]).

Client device 210 may execute the computational graph based on the compilation. Client device 210 may execute a primary node and a reference node in a single iteration of the computational graph. For example, a first iteration of the computational graph may include executing a primary node, such as Node 71 (e.g., "dsp.FFT[71]"), identified as "Primary Node A," and associated with the computational operation "output(dsp.FFT)." Execution of Primary Node A may cause client device 210 to perform an output operation on the dsp.FFT computation associated with Primary Node A. Performing the output operation may change a state value associated with Primary Node A (e.g., associated with the dsp.FFT computation), and may also change the state value associated with Reference Node A (e.g., Node 74, or "dsp.FFT[74]") because Reference Node A and Primary Node A area associated with the same computation (e.g., dsp.FFT). The state value associated with Reference Node A and Primary Node A may be the same state value (e.g., may be stored in the same memory location), or may be two identical copies of the state value, each stored in a separate memory location (e.g., a first memory location accessible by Reference Node A and a second memory location accessible by Primary Node A).

Later in the first iteration of the computational graph, client device 210 may execute Reference Node A, associated with the computational operation "update(dsp.FFT[71])." Execution of Reference Node A may cause client device 210 to perform an update operation on the dsp.FFT computation associated with Reference Node A. For example, execution of Reference Node A may update a state value associated with the dsp.FFT computation. Updating the state value of the dsp.FFT computation associated with Reference Node A may also update the state value associated with Primary Node A. In this way, client device 210 may permit multiple operations to be performed on the same computation in a single iterative execution of the computational graph.

Figure 8:
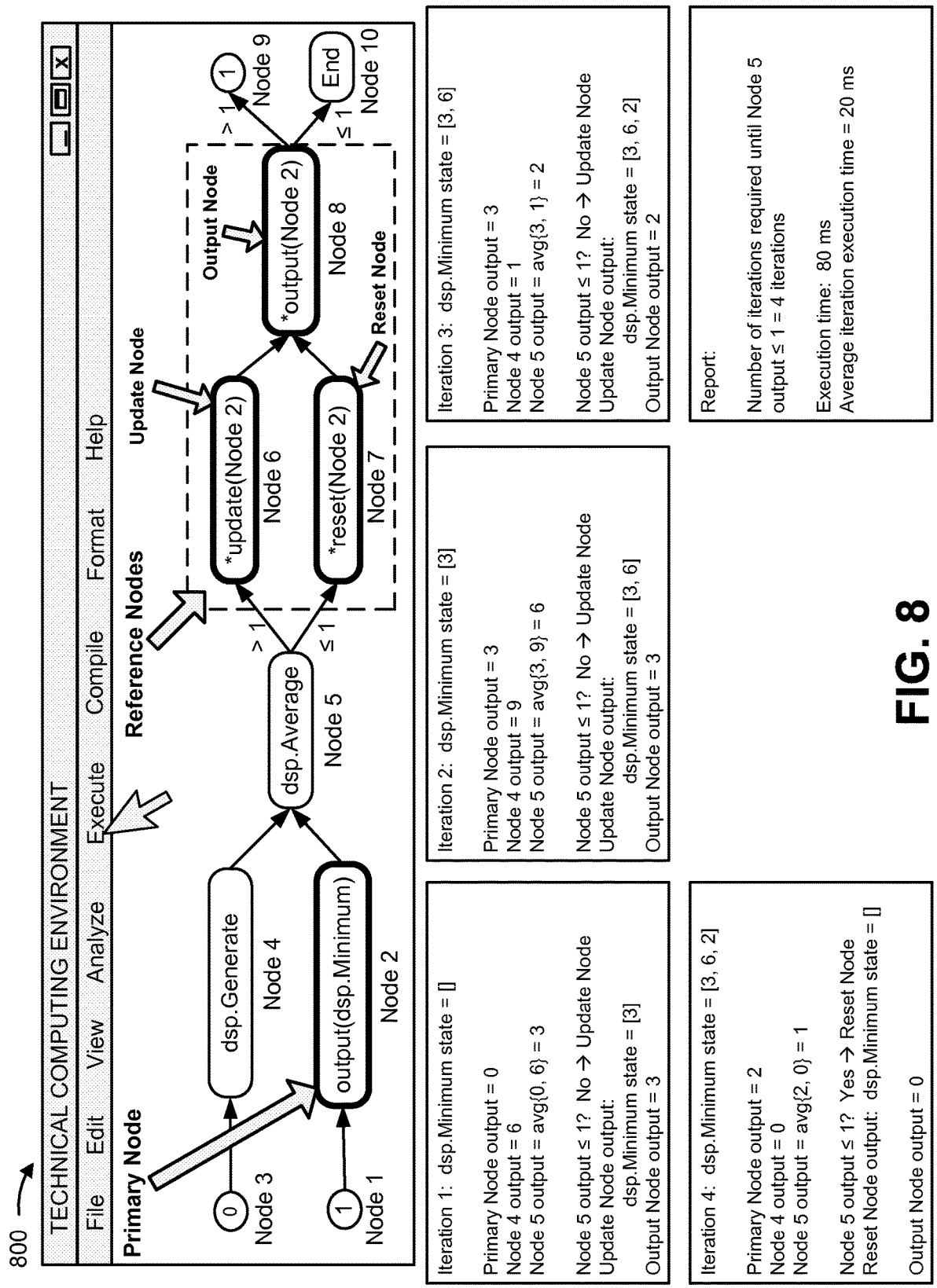
FIG. 8 is a diagram of another example implementation relating to the example process shown in FIG. 6.

FIG. 8 is a diagram of an example implementation 800 relating to example process 600 shown in FIG. 6. FIG. 8 depicts a computational graph that includes a single primary node, identified as "Primary Node," and multiple reference nodes associated with the Primary Node, including an "Update Node" (Node 6), a "Reset Node" (Node 7), and an "Output Node" (Node 8).

In example implementation 800, assume that in a single iteration of the computational graph, the Primary Node (e.g., Node 2) outputs a minimum value from a stored array of values, or outputs a value of zero if the stored array is empty (e.g., null). Further, Node 4 (e.g., dsp.Generate) generates a random integer between 0 and 9, inclusive. Node 5 (e.g., dsp.Average) calculates an average of the values output from Node 4 and the Primary Node. If the average value is greater than 1, then the Update Node (e.g., Node 6) is executed, and the stored array of values is updated to include the average value. If the average value is less than or equal to 1, then the Reset Node (e.g., Node 7) is executed, and the stored array of values is reset to an empty array. The Output Node (e.g., Node 8), outputs the minimum value from the stored array. The single iteration may finish executing when the computational graph reaches Node 9, and an additional iteration may execute if the average value is greater than 1. If the average value is less than or equal to 1, then execution of the computational graph may terminate.

As an example, assume that compilation of the computational graph initializes the state of dsp.Minimum with an empty array (e.g., [ ], or a null value). When executed in a first iteration of the computational graph, the Primary Node outputs a value of 0, based on the array being empty. Further assume that Node 4 generates a random integer value of 6, and Node 5 averages the values (e.g., 0 and 6) to generate an average value of 3. Because the average value of 3 is greater than 1, the Update Node executes, and adds the average value of 3 to the stored array of values. Because the stored array of values is now [3], the Output Node outputs the minimum value included in the array, which is 3.

In a second iteration of the computational graph, the Primary Node outputs the minimum value of 3. Assume that Node 4 generates a random integer value of 9, and Node 5 averages the values (e.g., 3 and 9) to generate an average value of 6. Because the average value of 6 is greater than 1, the Update Node executes, and adds the average value of 6 to the stored array of values. Because the stored array of values is now [3, 6], the Output Node outputs the minimum value included in the array, which is still 3.

In a third iteration of the computational graph, the Primary Node outputs the minimum value of 3. Assume that Node 4 generates a random integer value of 1, and Node 5 averages the values (e.g., 3 and 1) to generate an average value of 2. Because the average value of 2 is greater than 1, the Update Node executes, and adds the average value of 2 to the stored array of values. Because the stored array of values is now [3, 6, 2], the Output Node outputs the minimum value included in the array, which is now 2.

In a fourth iteration of the computational graph, the Primary Node outputs the minimum value of 2. Assume that Node 4 generates a random integer value of 0, and Node 5 averages the values (e.g., 2 and 0) to generate an average value of 1. Because the average value of 1 is less than or equal to 1, the Reset Node executes, and resets the stored array of values to an empty array (e.g., [ ]). Because the stored array of values is now empty, the Output Node outputs a value of 0. This may cause execution of the computational graph to finish.

Client device 210 may output a report based on execution of the computational graph. For example, the report may indicate that after the fourth iteration, the value output from Node 5 was less than or equal to 1. The report may also indicate an execution time of the four iterations (e.g., 80 milliseconds), and an average execution time of each iteration (e.g., 20 milliseconds).

In some implementations, the user may specify nodes to execute using a first processor, such as the Primary Node, and may specify nodes to execute using a second processor, such as the Reference Nodes. Such parallel processing may be permitted due to client device 210 allowing a user to specify multiple nodes that operate on a state of a single computation in a single iterative execution of a computational graph.

Certain implementations are described herein in connection with a graphically-based environment. However, other implementations are equally applicable to text-based environments and hybrid environments. For example, a common object (e.g., a textual object) may be used to represent computational nodes in a computational graph, and a property setting associated with the node may indicate that the node shares a computation with another node (e.g., may indicate that the node is a primary node or a reference node). Alternatively, different object types may be used, with a first object type representing primary nodes, a second object type representing reference nodes, and/or a third object type representing other nodes.

The foregoing disclosure provides illustration and description, but is not intended to be exhaustive or to limit the implementations to the precise form disclosed. Modifications and variations are possible in light of the above disclosure or may be acquired from practice of the implementations.

As used herein, component is intended to be broadly construed as hardware, firmware, or a combination of hardware and software.

As used herein, program code is to be broadly interpreted to include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, program code may include different combinations of the above-identified classes (e.g., text-based code, binary code, text files, etc.). Additionally, or alternatively, program code may include code generated using a dynamically-typed programming language (e.g., the M language, a MATLAB® language, a MATLAB-compatible language, a MATLAB-like language, etc.) that can be used to express problems and/or solutions in mathematical notations. Additionally, or alternatively, program code may be of any type, such as a function, a script, an object, etc., and a portion of program code may include one or more characters, lines, etc. of the program code.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
receive, through a first interface, a selection of a computational node, the computational node performing a computation based on a state value and a plurality of operations;
present the computational node in a computational graph;
receive a selection of a first operation of the plurality of operations of the computational node, the first operation to be presented as a primary node in the computational graph;

receive, through the first interface or a second interface, a selection of a second operation of the plurality of operations of the computational node, the second operation to be presented as a reference node in the computational graph;

present, in the computational graph, the primary node that represents the first operation selected from the plurality of operations of the computational node;

present, in the computational graph, the reference node that represents the second operation selected from the plurality of operations of the computational node, wherein, with the presentation of at least one of the primary node or the reference node in the computational graph, the computational graph no longer shows the computational node; and execute the primary node and the reference node, wherein the execute the primary node and the reference node includes performing the first operation and the second operation of the computational node and further includes modifying the state value, wherein the state value as modified is accessible to the primary node and the reference node.

2. The device of claim 1, where the primary node and the reference node share a common parameter that influences a manner in which the first operation and the second operation are performed; and where the one or more processors, when executing the primary node and the reference node, are to:

execute the primary node and the reference node based on the common parameter.

3. The device of claim 1, where the state value is stored at a common memory location, the common memory location being accessed by the primary node during execution of the primary node, and being accessed by the reference node during execution of the reference node.

4. The device of claim 1, where the one or more processors are further to:

execute the primary node prior to executing the reference node;

perform the first operation, based on a first value of the state value and based on executing the primary node, to form a modified value of the state value; and execute the reference node, after executing the primary node, by performing the second operation on the modified value of the state value.

5. The device of claim 1, where the first operation and the second operation are at least one of:

a setup operation,
a step operation,
a terminate operation,
an update operation,
an output operation, or a reset operation.

6. The device of claim 1, where the one or more processors, when executing the primary node and the reference node, are to:

execute the primary node using a first computational resource; and execute the reference node using a second computational resource, where the first computational resource and the second computational resource are different.

7. The device of claim 1, where the one or more processors, when executing the primary node and the reference node, are to:

execute the primary node at a first rate; and
execute the reference node at a second rate,
where the first rate and the second rate are different.

8. The device of claim 1, where the first operation and the second operation are the same operation of the plurality of operations of the computational node.

9. The device of claim 1, where the execute the primary node and the execute the reference node occur in a single iteration of the computational graph.

10. The device of claim 1 wherein the present the primary node in the computational graph includes replacing the computational node with the primary node.

11. The device of claim 1 wherein the computation performed by the computational node is a filter computation and the second operation presented by the reference node is a reset operation.

12. The device of claim 11 wherein the reset operation sets the state value to a default value.

13. A non-transitory computer-readable medium storing instructions, the instructions comprising:

one or more instructions that, when executed by a processor, cause the processor to:

receive, through a first interface, a selection of a computational node, the computational node performing a computation based on a state value and a plurality of operations;

present the computational node in a computational graph;

receive a selection of a first operation of the plurality of operations of the computational node, the first operation to be presented as a primary node in the computational graph;

receive, through the first interface or a second interface, a selection of a second operation of the plurality of operations of the computational node, the second operation to be presented as a reference node in the computational graph;

present, in the computational graph, the primary node that represents the first operation selected from the plurality of operations of the computational node;

present, in the computational graph, the reference node that represents the second operation selected from the plurality of operations of the computational node, wherein, with the presentation of at least one of the primary node or the reference node in the computational graph, the computational graph no longer shows the computational node; and execute the primary node and the reference node, wherein the execute the primary node and the reference node includes performing the first operation and the second operation of the computational node and further includes modifying the state value, wherein the state value as modified is accessible to the primary node and the reference node.

14. The non-transitory computer-readable medium of claim 13, where the primary node and the reference node share a common parameter that impacts a manner in which the first operation and the second operation are performed;

where the one or more instructions, that cause the processor to execute the primary node and the reference node, cause the processor to:

execute the primary node and the reference node based on the common parameter.

15. The non-transitory computer-readable medium of claim 13, where the state value is stored at a common memory location that is accessible to the primary node and the reference node.

16. The non-transitory computer-readable medium of claim 13, where the first operation and the second operation include at least one of a setup operation, a step operation, or a terminate operation.

17. The non-transitory computer-readable medium of claim 13, where the first operation and the second operation include at least one of an output operation, an update operation, a reset operation, a setup operation, a step operation, or a terminate operation.

18. The non-transitory computer-readable medium of claim 13, where the first operation and the second operation are the same operation of the plurality of operations of the computational node.

19. The non-transitory computer-readable medium of claim 13, where the execute the primary node and the execute the reference node occur in a single iteration of the computational graph.

20. A method, comprising:
receive, through a first interface, a selection of a computational node, the computational node performing a computation based on a state value and a plurality of operations;
present the computational node in a computational graph;
receive a selection of a first operation of the plurality of operations of the computational node, the first operation to be presented as a primary node in the computational graph;
receive, through the first interface or a second interface, a selection of a second operation of the plurality of operations of the computational node, the second operation to be presented as a reference node in the computational graph;
present, in the computational graph, the primary node that represents the first operation selected from the plurality of operations of the computational node;
present, in the computational graph, the reference node that represents the second operation selected from the plurality of operations of the computational node, wherein, with the presentation of at least one of the primary node or the reference node in the computational graph, the computational graph no longer shows the computational node; and
execute the primary node and the reference node, wherein the execute the primary node and the reference node includes performing the first operation and the second operation of the computational node and further includes modifying the state value,
wherein the state value as modified is accessible to the primary node and the reference node.

21. The method of claim 20, where the primary node and the reference node share a common parameter that impacts a manner in which the first operation and the second operation are performed; and
where executing the primary node and the reference node comprises:
executing the primary node and the reference node based on the common parameter.

22. The method of claim 20, where the state value is stored at a common memory location accessible to both the primary node and the reference node.

23. The method of claim 20, where executing the primary node and the reference node comprises:
executing the primary node prior to executing the reference node;
performing the first operation, using a first value of the state value, to form a modified value of the state value based on executing the primary node;
storing the modified value of the state value in a first memory location;
executing the reference node after executing the primary node; and
performing the second operation using the modified value of the state value, stored in the first memory location, based on executing the reference node after executing the primary node.

24. The method of claim 20, where the first operation and the second operation are at least one of:
a setup operation,
a step operation,
a terminate operation,
an update operation,
an output operation, or
a reset operation.

25. The method of claim 20, where the first operation and the second operation are the same operation of the plurality of operations of the computational node.

26. The method of claim 20, where the execute the primary node and the execute the reference node occur in a single iteration of the computational graph.

* * * * *